US010815904B2

(12) United States Patent
Cafaro et al.

(10) Patent No.: US 10,815,904 B2
(45) Date of Patent: Oct. 27, 2020

(54) PROGNOSTIC HEALTH MANAGEMENT CONTROL FOR ADAPTIVE OPERABILITY RECOVERY FOR TURBINE ENGINES

(71) Applicant: General Electric Company, Schenectady, NY (US)

(72) Inventors: Stefan Joseph Cafaro, Maineville, OH (US); James Ryan Reepmeyer, Cincinnati, OH (US); Gagan Adibhatla, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 15 days.

(21) Appl. No.: 16/294,324

(22) Filed: Mar. 6, 2019

(65) Prior Publication Data

US 2020/0284204 A1 Sep. 10, 2020

(51) Int. Cl.

| | |
|---|---|
| ***F02C 9/20*** | (2006.01) |
| ***F01D 17/02*** | (2006.01) |
| ***G05B 15/02*** | (2006.01) |
| ***F02K 3/04*** | (2006.01) |
| ***B64D 27/12*** | (2006.01) |

(52) U.S. Cl.

CPC ................ *F02C 9/20* (2013.01); *F01D 17/02* (2013.01); *G05B 15/02* (2013.01); *B64D 27/12* (2013.01); *F02K 3/04* (2013.01); *F05D 2220/323* (2013.01); *F05D 2260/80* (2013.01); *F05D 2270/101* (2013.01); *F05D 2270/301* (2013.01); *F05D 2270/42* (2013.01)

(58) Field of Classification Search

CPC ... F01D 17/02; F02C 9/20; F02K 3/04; G05B 15/02; B64D 27/12; F05D 2220/323; F05D 2260/80; F05D 2270/101; F05D 2270/301; F05D 2270/42

See application file for complete search history.

(56) References Cited

U.S. PATENT DOCUMENTS

| | | | |
|---|---|---|---|
| 5,301,500 A | 4/1994 | Hines | |
| 6,231,306 B1 * | 5/2001 | Khalid | F01D 17/08 415/118 |
| 7,869,928 B2 * | 1/2011 | Hoff | G05B 23/0254 701/100 |
| 8,417,410 B2 | 4/2013 | Moeckly et al. | |
| 8,939,399 B2 | 1/2015 | Kouros et al. | |
| 9,002,615 B2 | 4/2015 | Kumar et al. | |
| 9,260,976 B2 | 2/2016 | Phillips et al. | |
| 9,441,547 B2 | 9/2016 | Cai et al. | |
| 9,482,236 B2 | 11/2016 | Khalid et al. | |
| 9,593,591 B2 | 3/2017 | Phillips et al. | |
| 9,878,692 B2 | 1/2018 | Cai et al. | |
| 10,023,319 B2 | 7/2018 | Teicholz et al. | |

(Continued)

*Primary Examiner* — Igor Kershteyn

(74) *Attorney, Agent, or Firm* — Dority & Manning, P.A.

(57) ABSTRACT

The subject matter of the present disclosure is directed to a turbine engine having an adaptive prognostic health management control system that passively monitors stall margin reductions and applies corrective trims to a power management schedule of the engine to recover operability over time whilst maintaining a sufficient level of stall margin over the life cycle of the engine. The control system can adjust the power management schedule as needed to sustain a target stall margin, which allows for a more optimized and gradual performance to operability trade-off.

20 Claims, 8 Drawing Sheets

14
10
40
16
AIR
38
26
34
36
44
22
24
28
32
110
86
112
86
88
FUEL
90
114
92
126
120
200
DATA
130
100

(56) References Cited

U.S. PATENT DOCUMENTS

| | | | | |
|---|---|---|---|---|
| 2002/0161550 | A1* | 10/2002 | Bharadwaj | F04D 29/661 702/182 |
| 2005/0086942 | A1* | 4/2005 | Adibhatla | F02C 9/28 60/772 |
| 2010/0257838 | A1* | 10/2010 | Mazzaro | F01D 21/003 60/39.091 |
| 2010/0281875 | A1* | 11/2010 | Price | F01D 17/162 60/772 |
| 2014/0093350 | A1* | 4/2014 | Meisner | F02C 9/52 415/1 |
| 2017/0175646 | A1 | 6/2017 | Adibhatla | |

* cited by examiner

PROGNOSTIC HEALTH MANAGEMENT CONTROL FOR ADAPTIVE OPERABILITY RECOVERY FOR TURBINE ENGINES

FEDERALLY SPONSORED RESEARCH

This invention was made with government support under contract number N00014-10-D-0010. The U.S. government may have certain rights in the invention.

FIELD

The subject matter of the present disclosure relates generally to control systems for gas turbine engines, and more particularly to control systems that apply corrective trims to power management schedules based on detected deterioration of compressor elements.

BACKGROUND

Performance for gas turbine engines is typically margined so that compressor stall can be avoided for worst-case conditions on a fully deteriorated engine. Thus, engine peak thrust and operational transients are limited, even for new engines. Entire fleets of engines can be designed to accommodate worst-case conditions. While such conventional control schemes typically guarantee that a worst-case fully deteriorated engine of a fleet will not stall under normal operation, controlling an engine in such a manner results in a penalty on the performance of the engine for the vast majority of the engine's life cycle. Stated differently, engines controlled by conventional systems typically operate with excess operability margin until the engine has fully deteriorated to a worst-case scenario condition. As a result, engine performance is less than optimal for the vast majority of the engine's life cycle.

Accordingly, an engine having a control system that addresses one or more of the challenges noted above would be useful. Moreover, a method for controlling an engine that addresses one or more of the challenges noted above would be beneficial. Particularly, a control system and method that provide enhanced performance, such as peak thrust and faster transients, as well as enable condition-based maintenance scheduling would be advantageous.

BRIEF DESCRIPTION

Aspects and advantages of the invention will be set forth in part in the following description, or may be obvious from the description, or may be learned through practice of the invention.

In one aspect, a control system for an engine having a compressor element is provided. The control system includes a sensor operable to sense an operating characteristic associated with the compressor element. Further, the control system includes one or more computing devices communicatively coupled with the sensor. The one or more computing devices are configured to: receive, from the sensor, data indicative of the operating characteristic associated with the compressor element; determine a signal indicative of a stall margin of the compressor element over time based at least in part on the received data; determine a health status indicator of the compressor element based at least in part on the determined signal; determine a corrective trim for adjusting a power management schedule of the engine based at least in part on the health status indicator of the compressor element; and adjust the power management schedule of the engine based at least in part on the corrective trim.

In another aspect, a method is provided. The method includes operating an engine having a compressor element. Further, the method includes setting, by one or more computing devices, a stall margin target associated with the compressor element. The method also includes receiving, by the one or more computing devices, data indicative of an operating characteristic associated with the compressor element of the engine. In addition, the method includes determining, by the one or more computing devices, a signal indicative of a stall margin of the compressor element over time based at least in part on the received data. The method further includes determining, by the one or more computing devices, a health status indicator of the compressor element based at least in part on the determined signal. In addition, the method includes determining, by the one or more computing devices, a corrective trim for adjusting a power management schedule of the engine based at least in part on the health status indicator and the stall margin target. In addition, the method includes adjusting, by the one or more computing devices, the power management schedule of the engine based at least in part on the determined corrective trim.

In yet another aspect, a turbine engine is provided. The turbine engine includes a compressor element and a sensor operable to sense an operating characteristic associated with the compressor element. Further, the turbine engine includes one or more computing devices communicatively coupled with the sensor. The one or more computing devices are configured to: receive, from the sensor, data indicative of the operating characteristic associated with the compressor element; convert the data into a signal indicative of a stall margin of the compressor element; determine a health status indicator of the compressor element based at least in part on the signal; determine a corrective trim for adjusting a power management schedule of the engine based at least in part on the health status indicator; and adjust the power management schedule of the engine based at least in part on the corrective trim.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
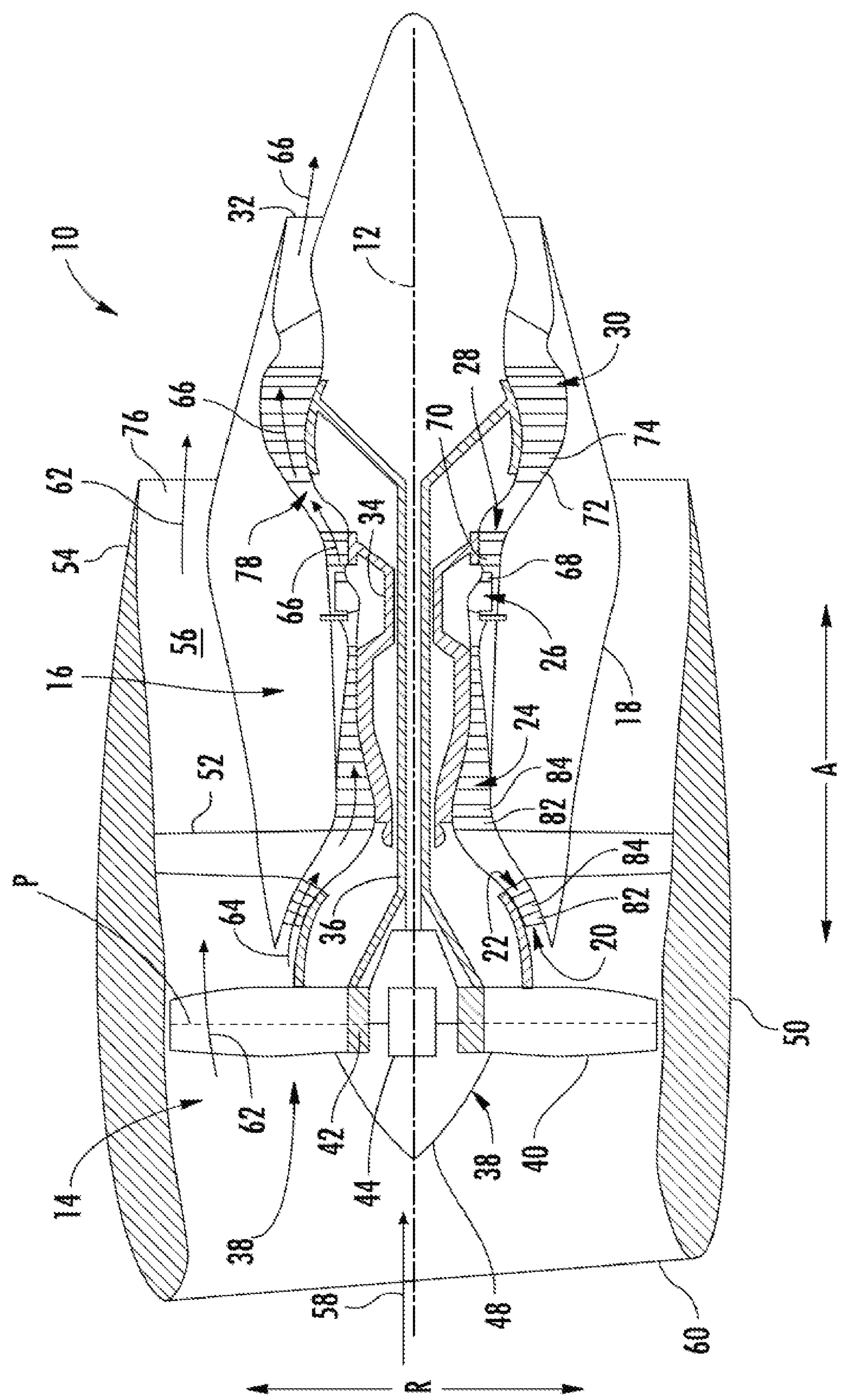
FIG. 1 provides a schematic cross-sectional view of a gas turbine engine in accordance with exemplary aspects of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference. Furthermore, as used herein, terms of approximation, such as "approximately," "substantially," or "about," refer to being within a fifteen percent (15%) margin of error unless otherwise stated.

Generally, the present disclosure is directed to control systems for turbine engines and methods for controlling turbine engines. In one example aspect, a controller of a control system can receive data indicative of an operating characteristic associated with a compressor element of the engine. For instance, the data can be indicative of the pressure across an annular array of compressor blades. The data can be received by the controller from one or more high bandwidth sensors. The received data can be converted into a signal indicative of the stall margin of the compressor element over time. The signal indicative of the stall margin over time can be passively monitored by a Prognostic Health Management (PHM) model of the controller, and based on the monitored signal, the health of the compressor element can be determined, e.g., continuously, at a predetermined interval, or upon a trigger condition. For instance, the PHM model can determine the stall margin lost or deterioration of the compressor element based at least in part on the signal, which is indicative of the health of the compressor element.

Based on the health of the compressor element, a corrective trim for adjusting a power management schedule of the engine can be determined. Using adaptive control logic of the controller, the determined corrective trim can be used to adjust or trim the power management schedule. In this way, operation closer to the stall line can be achieved when the engine is healthy leading to improved engine performance. Particularly, the adaptive control system enables the engine to operate closer to the stall line by accommodating engine deterioration over time. More aggressive power management scheduling can improve engine transients and increase peak thrust output. Additionally, the control system can recommend preventative maintenance and contribute to increased time on wing, among other benefits and advantages.

FIG. 1 provides a schematic cross-sectional view of a gas turbine engine in accordance with an example embodiment of the present disclosure. For the depicted embodiment of FIG. 1, the gas turbine engine is a high-bypass turbofan jet engine 10, referred to herein as "turbofan engine 10." The turbofan 10 can be mounted to an aerial vehicle, such as e.g., a fixed-wing aircraft. As shown in FIG. 1, the turbofan 10 defines an axial direction A, a radial direction R, and a circumferential direction. Moreover, the turbofan 10 defines an axial centerline or longitudinal axis 12 that extends therethrough for reference purposes. In general, the longitudinal axis 12 and the axial direction A extend parallel to one another, the radial direction R extends inward toward and outward from the longitudinal axis 12 orthogonal to the axial direction A, and the circumferential direction extends concentrically around the longitudinal axis 12.

The turbofan 10 includes a fan section 14 and a core turbine engine 16 disposed downstream of the fan section 14. The core turbine engine 16 includes a substantially tubular outer casing 18 that defines an annular core inlet 20. The outer casing 18 encases, in serial flow relationship, a compressor section including a booster or low pressure (LP) compressor 22 and a high pressure (HP) compressor 24; a combustor section including a combustor 26; a turbine section including a high pressure turbine 28 and a low pressure turbine 30; and a jet exhaust nozzle section 32. A high pressure shaft or spool 34 drivingly connects the HP turbine 28 to the HP compressor 24. A low pressure shaft or spool 36 drivingly connects the LP turbine 30 to the LP compressor 22.

Each compressor 22, 24 can include a plurality of compressor elements. Particularly, for this embodiment, each compressor 22, 24 of the turbofan 10 includes a plurality of compressor stages, with each stage including both an annular array of stationary compressor vanes 82 and an annular array of rotating compressor blades 84 positioned immediately downstream of the compressor vanes 82. Additionally, the compressors 22, 24 can include one or more variable geometry components 86 (FIG. 2), including inlet guide vanes (IGVs), outlet guide vanes (OGVs), variable stator vanes, etc. Further, one or more bleed valves 88 (FIG. 2) can be positioned along the compressor 24 and/or compressor 22 and are operable to move open and closed such that pressurized air can be bled from the core air flowpath of the core engine 16 of the turbofan 10. The bleed air bled through the bleed valves 88 can be routed to other engine systems, such as e.g., an active clearance control system for the HP turbine 28, or to various vehicle systems to which the engine is attached, such as e.g., a cabin air pressure system for pressurizing the cabin of an aircraft.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36.

Referring still to the exemplary embodiment of FIG. 1, the disk 42 is covered by rotatable spinner 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 can extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustor 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Figure 2:
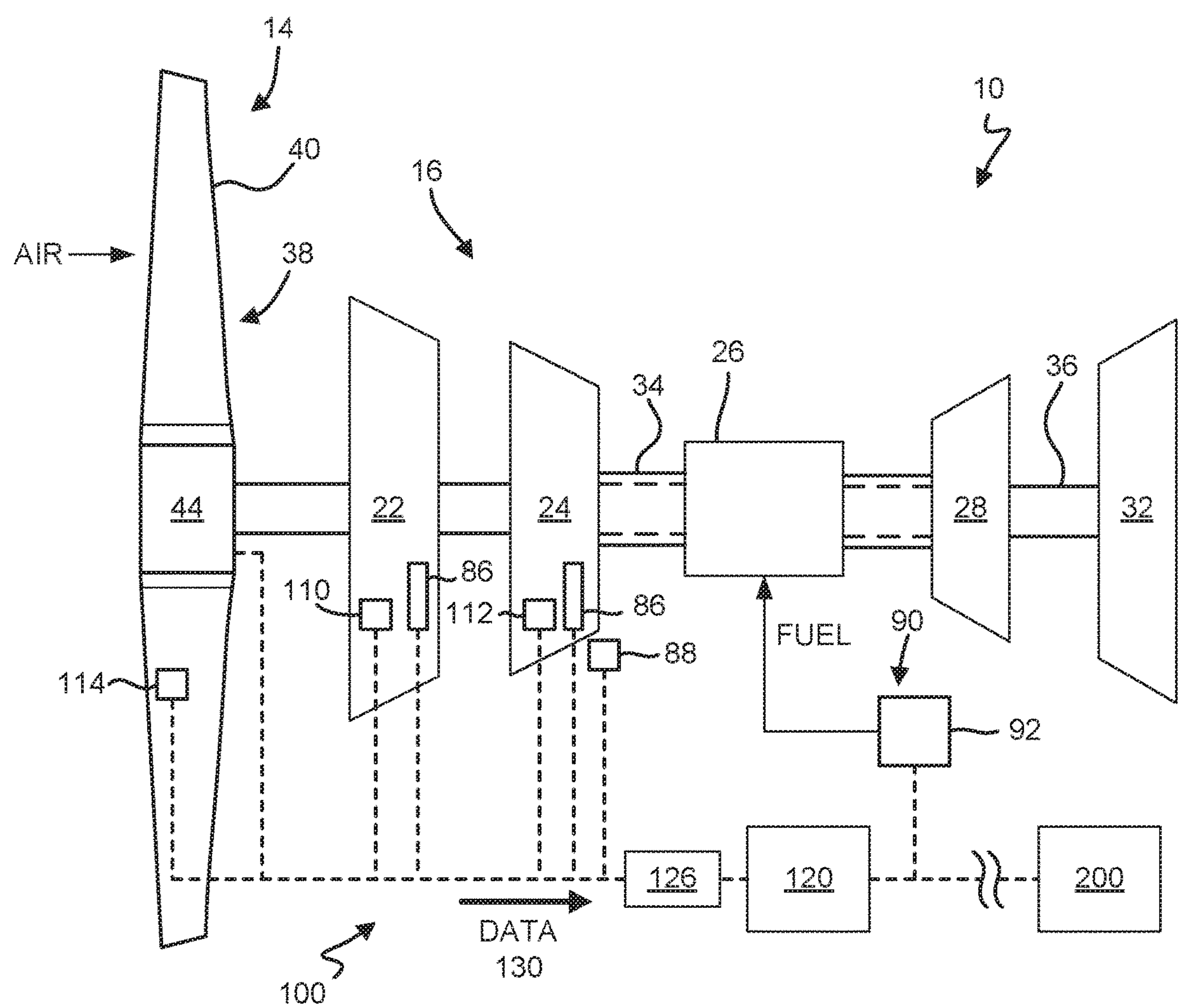
FIG. 2 provides a schematic view of the gas turbine engine of FIG. 1 and depicts a control system thereof.

FIG. 2 provides a schematic view of the turbofan 10 of FIG. 1 and depicts a control system 100 thereof. As shown, the control system 100 can include a number of sensors for sensing various operating characteristics of the engine, e.g., during operation of the engine. For this embodiment, the control system 100 includes a sensor 110 operable to sense an operating characteristic associated with a compressor element of the LP compressor or booster 22. Particularly, the sensor 110 is a pressure sensor operable to sense pressure fluctuations caused by compressor blade tip vortices as the blades of the booster 22 rotate past the sensor 110. Thus, in this example, the operating characteristic is the pressure at a compressor element of the booster 22. Further, for this embodiment, the sensor 110 is a high bandwidth pressure sensor. However, in alternative embodiments, the sensor 110 can sense other operating characteristics associated with the compressor element of the booster 22, such as e.g., temperature. As used herein, the term “compressor element” can mean an array of vanes or blades in a particular stage of a compressor, a single vane or blade of a stage of the compressor, multiple stages of vanes and blades, and/or the compressor as a whole.

The control system 100 also includes a sensor 112 operable to sense an operating characteristic associated with a compressor element of the HP compressor 24. For this embodiment, the sensor 112 is a pressure sensor operable to sense pressure fluctuations caused by compressor blade tip vortices as the blades of the HP compressor 24 rotate past the sensor 112. Further, the sensor 112 is a high bandwidth pressure sensor. However, in alternative embodiments, the sensor 112 can sense other operating characteristics of the HP compressor 24, such as e.g., temperature. The control system 100 also includes a sensor 114 operable to sense an operating characteristic associated with a compressor element of the fan 38. For this embodiment, the sensor 114 is a pressure sensor operable to sense pressure fluctuations caused by fan blade tip vortices as the blades 40 of the fan 38 rotate past the sensor 114. Further, the sensor 114 is a high bandwidth pressure sensor. However, in alternative embodiments, the sensor 114 can sense other operating characteristics of the fan 38, such as e.g., temperature.

In addition, the control system 100 of the turbofan 10 includes one or more computing devices for controlling operation of the turbofan 10. Particularly, for this embodiment, the control system 100 includes a controller 120 configured for controlling various aspects of the turbofan 10. Specifically, the controller 120 is configured to perform one or more operations or functions for stability control of one or both compressors 22, 24 of the turbofan 10 and for provided improved performance of the engine during its life cycle. The controller 120 can be configured in substantially the same manner as one of the computing devices of the exemplary computing system 500 described below with reference to FIG. 13 (and may be configured to perform one or more of the functions of the exemplary method (400) described herein). The controller 120 may be a system of controllers or a single controller. In some embodiments, the controller 120 can be an engine controller. The controller 120 can be, for example, an Electronic Engine Controller (EEC) or an Electronic Control Unit (ECU). The controller 120 can operate as a control device of a Full Authority Digital Engine Control (FADEC) system of a vehicle, such as e.g., an aerial vehicle.

The controller 120 is communicatively coupled with various components of the turbofan engine 10 as shown in FIG. 2 (e.g., via one or more suitable wired and/or wireless communication links). For this embodiment, the controller 120 is communicatively coupled with the sensors 110, 112, 114, fuel metering device 92 of the fuel system 90, variable geometry components 86 of the LP and HP compressors 22, 24, as well as the actuation member 44 of the fan 38. As will be appreciated the controller 120 can be communicatively coupled with other components of the turbofan engine 10, to other computing systems or components of a vehicle to which the turbofan engine 10 is mounted, to various remote computing systems 200 or components (e.g., a ground system, a maintenance entity, an analytics entity, etc.), as well as other components or computing systems.

In addition, for this embodiment, the one or more computing devices of control system 100 include a signal interpreter box 126 operable to translate or convert high frequency data from one or more sensors (e.g., sensors 110, 112, 114) into a signal indicative of the stall margin remaining or health of a compressor element. The signal interpreter box 126 can calculate the stall margin remaining for a blade, a stage, or a whole compressor of the turbofan 10, for example. The calculated stall margin remaining signal can be routed from the signal interpreter box 126 to the controller 120 so that the controller 120 can control the turbofan 10 in accordance with the calculated stall margin remaining signal. Although the signal interpreter box 126 is shown offboard the controller 120 in FIG. 2, in some alternative embodiments, the signal interpreter box 126 can be onboard the controller 120.

Figure 3:
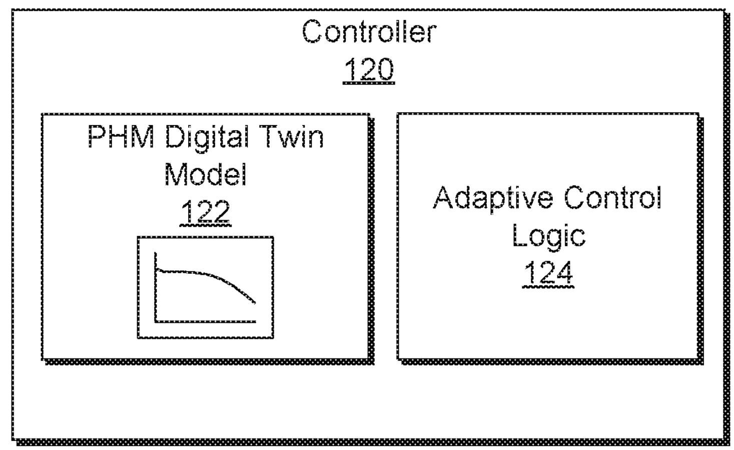
FIG. 3 provides a schematic view of a controller of the control system of FIG. 2.

FIG. 3 provides a schematic view of the controller 120 depicting various models and control logic thereof. As shown, the controller 120 includes a PHM digital twin model 122. The PHM model 122 can be embedded within the controller 120 as shown. The PHM model 122 is operable to virtually represent or model one or more physical objects or elements of the turbofan 10 (FIG. 2) across their respective life cycles. For instance, the health of a compressor element (e.g., an annular array of compressor blades) can be modeled or virtually represented by the PHM model 122, e.g., based at least in part on sensed, measured, and/or calculated inputs or signals. The PHM model 122 can model a plurality of components individually or as a system of components.

Further, the controller 120 also includes adaptive control logic 124. As will be explained herein, the adaptive control logic 124 can be utilized by the controller 120 to adjust or trim a power management schedule of the turbofan 10 via corrective trims. For instance, the adaptive control logic 124 can adjust the power management schedule of the turbofan 10 based at least in part on the health of one or more compressor elements as determined by the PHM model 122.

Thus, in taking into account the deterioration of the compressor elements over time, the control system 100 can control the turbofan 10 to operate closer to the compressor stall line during normal operation of the engine. In this way, engine performance can be improved over the life cycle of the engine.

Figure 4:
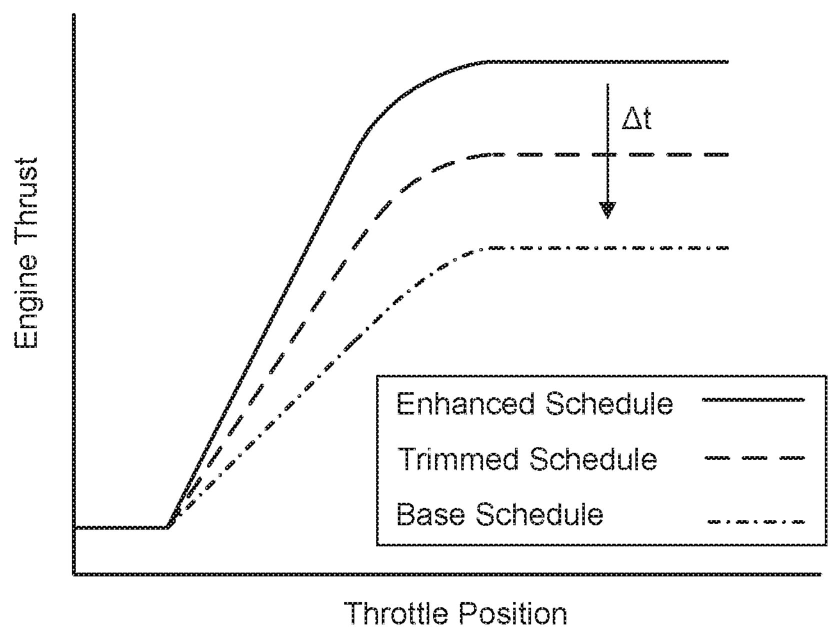
FIG. 4 provides a graph depicting engine thrust for various power management schedules as a function of throttle position in accordance with exemplary aspects of the present disclosure.

FIG. 4 provides a graph depicting engine thrust for various power management schedules as a function of throttle position (or power demanded). Particularly, FIG. 4 depicts engine thrust versus throttle position for an enhanced power management schedule or "Enhanced Schedule", engine thrust versus throttle position for a base schedule or "Base Schedule", and a trimmed power management schedule or "Trimmed Schedule." The Enhanced Schedule is representative of a power management schedule that can be set by the controller 120 for a fully healthy engine having minimal, if any, deterioration. As shown, optimal thrust can be produced by the engine if the Enhanced Schedule is set by the controller 120. On the other end of the spectrum, the Base Schedule is representative of a power management schedule that can be set by the controller 120 such that compressor stall for a worst-case fully deteriorated engine can be avoided. As noted previously, such, conventional control schemes typically set the power management schedule using the Base Schedule for the duration of the engine's life cycle. As shown, if the controller 120 sets the power management schedule as the Base Schedule instead of the Enhanced Schedule, less thrust is produced by the engine for the same increased throttle positions (or high power). Accordingly, while the Base Schedule prevents the compressor stall when the engine is fully deteriorated, less than optimal engine performance is achieved for increased throttle positions (or high power) if the controller 120 sets the power management schedule as the Base Schedule.

In accordance with inventive aspects of the present subject matter, the controller 120 can adjust or trim the power management schedule to yield trimmed schedules as the engine deteriorates over time. That is, as the engine deteriorates over time, the controller 120 can adjust or trim the Enhanced and/or Base schedule to prevent compressor stall whilst achieving enhanced engine performance, e.g., more thrust for a given throttle position. Accordingly, over the life cycle of the engine, the controller 120 can initially set the power management schedule of the engine at the Enhanced Schedule. Then, as the engine deteriorates, corrective trims can be applied (e.g., to the Enhanced Schedule or the Base Schedule) such that the Trimmed Schedule moves generally from the Enhanced Schedule to the Base Schedule (or downward in the direction of the arrow labeled as "At" shown in FIG. 4). Once sufficient compressor stall or operability margin can no longer be achieved by applying corrective trims, the controller 120 can set the power management schedule at the Base schedule so that compressor stall can be avoided. Further, the controller 120 can request preventative maintenance at such a time.

Figure 5:
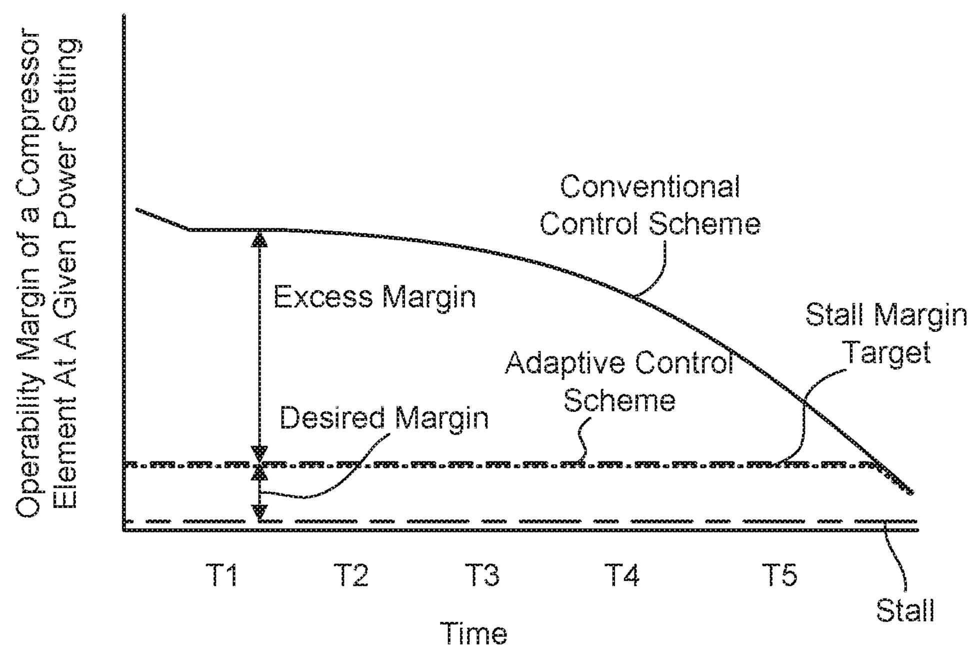
FIG. 5 provides a graph depicting the operability margin of a compressor element at a given power setting of the engine utilizing a conventional control scheme versus time and depicts the operability margin of the compressor element at the given power setting of the engine utilizing the control scheme of the present subject matter versus time in accordance with exemplary aspects of the present subject matter.
Figure 6:
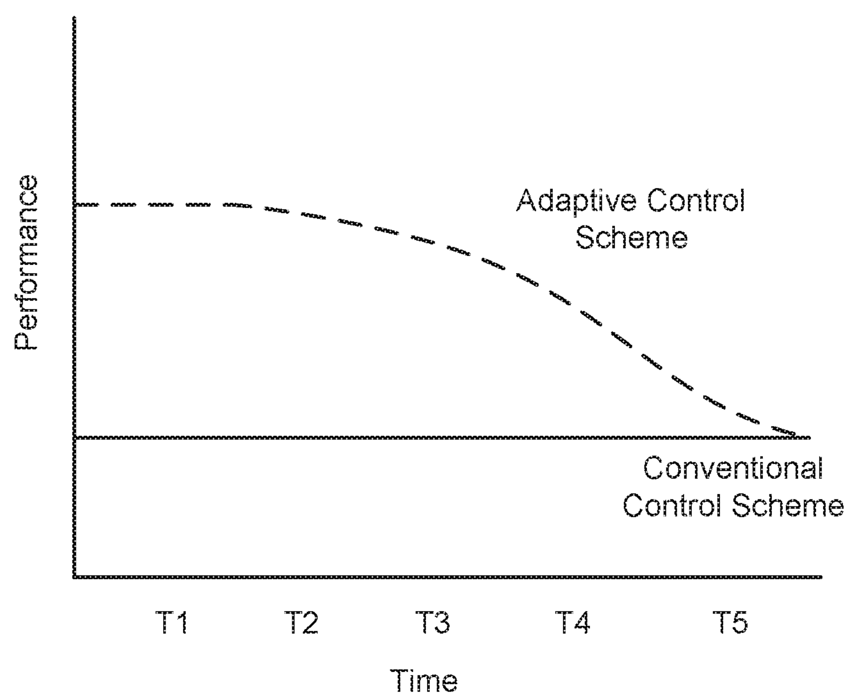
FIG. 6 provides a graph depicting performance of the compressor element versus time for the two control schemes of FIG. 5 in accordance with exemplary aspects of the present subject matter.

FIGS. 5 and 6 graphically depict the advantages of the adaptive control scheme of the present subject matter versus conventional control schemes. Specifically, FIG. 5 provides a graph depicting the operability margin of a compressor element at a given power setting of the engine utilizing a conventional control scheme (labeled as "Conventional Control Scheme" in FIG. 5) versus time and depicts the operability margin of the compressor element at the given power setting of the engine utilizing the adaptive control scheme of the present subject matter (labeled as "Adaptive Control Scheme" in FIG. 5) versus time. FIG. 6 provides a graph depicting performance of the compressor element versus time for the two different control schemes of FIG. 5.

As shown in FIG. 5, with the power management schedule trimmed with corrective trims as depicted in FIG. 4, the operability or stall margin of the compressor element controlled using the adaptive control scheme of the present subject matter can achieve a relatively flat operability margin (e.g., by trimming the power management schedule) and can closely track a Stall Margin Target set by the controller 120 (e.g., automatically or based on a pilot input). The Stall Margin Target can be set by the controller 120 such that a sufficient or desired margin provides a buffer between stall and the operating line of the engine. Generally, as shown, utilizing the Adaptive Control Scheme, the engine can operate closer to stall for the vast majority of the life cycle of the engine compared to engines controlled by Conventional Control Schemes. Consequently, as shown in FIG. 6, improved performance can be achieved using the Adaptive Control Scheme for the vast majority of the life cycle of the engine.

In contrast, with the power management schedule of the conventional control scheme set to the Base Schedule (FIG. 4) for the entirety of the life cycle of the engine, the operability margin of the compressor element controlled using the Conventional Control Scheme has significant excess margin relative to the operability margin that can be achieved using the Adaptive Control Scheme. Consequently, performance of the compressor element remains relatively flat over the life cycle of the engine as shown in FIG. 6.

With reference generally to FIG. 2, the control system 100 can control the turbofan engine 10 to operate closer to stall with improved performance to achieve the benefits and advantages described above in the following example manner. As depicted, the signal interpreter box 126 is configured to receive, from one or more sensors, data 130 indicative of an operating characteristic associated with a compressor element of the engine. For instance, the signal interpreter box 126 can receive data 130 from sensor 110 that is indicative of an operating characteristic associated with a compressor element of the booster 22. Additionally or alternatively, the signal interpreter box 126 can receive data 130 from sensor 112 that is indicative of an operating characteristic associated with a compressor element of the HP compressor 24. Additionally or alternatively, the signal interpreter box 126 can receive data 130 from sensor 114 that is indicative of an operating characteristic associated with a compressor element of the fan 38. The data 130 can be routed from one or more of the sensors 110, 112, 114 to the signal interpreter box 126 via a suitable wired or wireless communication link. The data 130 can be routed as an analog and/or digital signal. As noted above, the sensors 110, 112, 114 can be high bandwidth pressure sensors. Moreover, the signal interpreter box 126 can receive the data 130 indicative of the operating characteristic of the compressor element continuously or at predetermined intervals during operation of the turbofan 10. In this way, the controller 120 can continuously or nearly continuously monitor one or more operating characteristics of one or both of the compressors 22, 24 and/or the fan 38.

In some embodiments, the operating characteristic associated with the compressor element is at least one of a pressure and a temperature across or at the compressor element. For example, in some embodiments, the compressor element can be an array of compressor blades 84 (FIG. 1) of one of the compressors 22, 24 and the operating characteristic can be the pressure across the array of compressor blades 84. In yet another example, the compressor element can be the compressor 22 or the compressor 24 and the operating characteristic can be the pressure across the compressor 22 or the compressor 24. As yet another example, the compressor element can be a single compressor blade 84 of one of the compressors 22, 24 and the operating characteristic can be the pressure across the single compressor blade 84. In a further example, the compressor element can be the fan 38 or a single blade 40 of the fan 38 and the operating characteristic can be the pressure thereacross.

Figure 7:
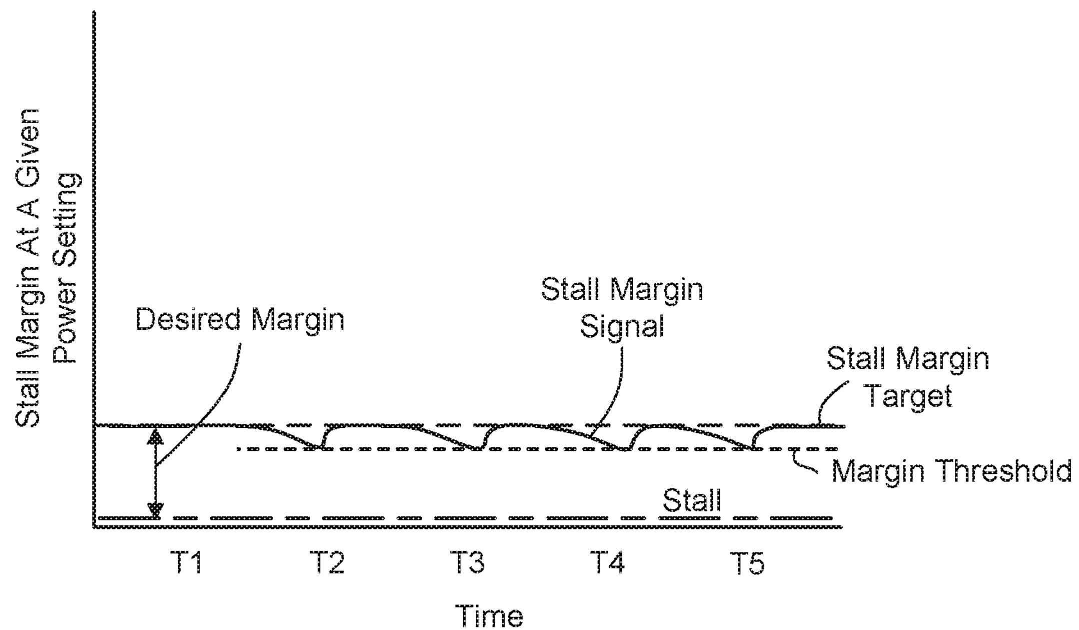
FIG. 7 provides a graph depicting a signal indicative of the stall margin of a compressor element versus time for a given power setting.

Upon receipt of the data 130, the signal interpreter box 126 can determine a signal indicative of a stall margin of the compressor element over time based at least in part on the received data. That is, the signal interpreter box 126 can covert the received data 130 into a signal indicative of the stall margin of the compressor element over time. The signal can be generated continuously over time as data 130 is received from the sensor. For instance, FIG. 7 provides a graph depicting a signal indicative of the stall margin of a compressor element versus time for a given power setting or transient, e.g., 88% of full power. The time of the graph of FIG. 7 spans the full life cycle of the engine. The signal labeled as “Stall Margin Signal” represents the determined signal indicative of the stall margin of the compressor element over time. Notably, the controller 120 is configured to set a stall margin target (labeled as “Stall Margin Target” in FIG. 7). The controller 120 can set the stall margin target automatically or based on user input, e.g., from a pilot. The Stall Margin Target is set at a higher margin than and is offset from Stall so that there is sufficient margin between the operating line of the engine and Stall. As shown in FIG. 7, the adaptive control scheme seeks to drive the Stall Margin Signal to the Stall Margin Target.

As the signal indicative of the stall margin of the compressor element over time is determined or generated by the signal interpreter box 126, the signal is routed to the controller 120 and the PHM model 122 (FIG. 3) of the controller 120 monitors the signal. Particularly, the PHM model 122 passively monitors the signal indicative of the stall margin remaining of the compressor element over time to determine whether the signal exceeds a margin threshold (labeled as “Margin Threshold” in FIG. 7). As depicted, in some instances, the stall margin of the compressor element (represented by the Stall Margin Signal) gradually moves away from or decreases from the Stall Margin Target. Eventually, the Stall Margin Signal decreases such that it exceeds the Margin Threshold. For instance, as shown in FIG. 7, the Stall Margin Signal exceeds the Margin Threshold at time T2, at time T3, at time T4, and at time T5.

After the signal indicative of the stall margin of the compressor element is determined by the signal interpreter box 126 and routed to the controller 120, the PHM model 122 (FIG. 3) of the controller 120 determines a health status indicator of the compressor element based at least in part on the determined signal. That is, the PHM model 122 determines the health of the compressor element. In some embodiments, the controller 120 is configured to determine the health status indicator of the compressor element based at least in part on the Stall Margin Signal continuously or at a predetermined interval. In other example embodiments, to advantageously conserve computing resources, the controller 120 is configured to determine the health status indicator of the compressor element based at least in part on the signal when the signal exceeds the margin threshold (e.g., when the Stall Margin Signal exceeds the Margin Threshold as shown in FIG. 7). For the depicted example of FIG. 7, the controller 120 determines the health status indicator of the compressor element at time T2, at time T3, at time T4, and at time T5 as these times correspond to instances in which the Stall Margin Signal exceeds the Margin Threshold.

Figure 8:
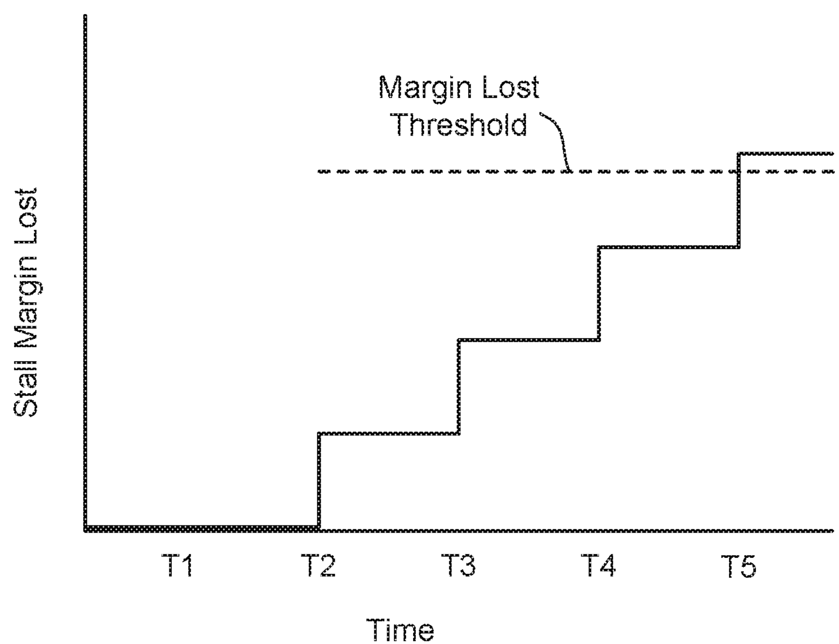
FIG. 8 provides a graph that depicts stall margin lost of the compressor element of FIG. 7 versus time.
Figure 9:
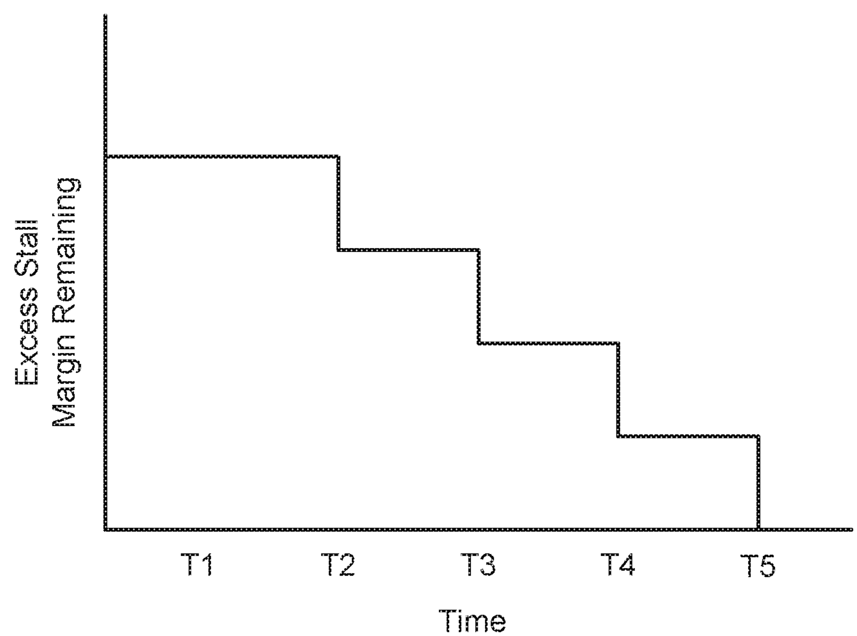
FIG. 9 provides a graph that depicts excess stall margin of the compressor element of FIG. 7 versus time.

In some embodiments, the health status indicator is indicative of a stall margin lost of the compressor element. For instance, FIG. 8 provides a graph that depicts stall margin lost of the compressor element of FIG. 7 versus time. With reference now to FIGS. 7 and 8, as shown, stall margin is lost at each point in time that the Stall Margin Signal exceeds the Margin Threshold. Particularly, the compressor element loses stall margin at time T2, at time T3, at time T4, and at time T5 as shown in FIG. 8. Moreover, notably, each time that the Stall Margin Signal exceeds the Margin Threshold, the stall margin lost of the compressor element increases. That is, as shown in FIG. 9, the excess stall margin (the inverse of stall margin lost; see also FIG. 5) achieved by the adaptive control scheme of the present disclosure decreases each time that the Stall Margin Signal exceeds the Margin Threshold. This is due to deterioration of the compressor element.

Generally, stall margin can be lost or reduced gradually over time. However, in some embodiments, the Stall Margin Lost can be tracked as a count or as a stall margin lost count; hence, the step function in FIG. 8. As shown, each time that the Stall Margin Signal exceeds the Margin Threshold as shown in FIG. 7, e.g., at time T2, at time T3, at time T4, and at time T5, a count is added to the stall margin lost count. Accordingly, as shown in FIG. 8, one count can be added to the stall margin lost count at time T2 for a total of one (1) count to the stall margin lost count, one count can be added to the stall margin lost count at time T3 for a total of two (2) counts to the stall margin lost count, one count can be added to the stall margin lost count at time T4 for a total of three (3) counts to the stall margin lost count, and one count can be added to the stall margin lost count at time T5 for a total of four (4) counts to the stall margin lost count. As will be explained below, in some embodiments, the total number of counts of the stall margin lost count can be associated or correlated with a corrective trim for a power management schedule of the engine.

Once the health status indicator is determined, the controller 120 is configured to determine a corrective trim for adjusting a power management schedule of the engine. The corrective trim can be determined by the adaptive control logic 124 (FIG. 3) of the controller 120 based at least in part on the determined health status indicator of the compressor element. The corrective trim can include instructions for adjusting the power management schedule. For example, the corrective trim can include instructions for adjusting the power management schedule such that various aircraft systems are adjusted, such as e.g., the geometry of the variable geometry components 86 (FIG. 2), the speed of the fan 38, the pitch of the fan blades 40 in embodiments in which the fan blades 40 are rotatable about respective pitch axes P (FIG. 1), the flow to combustor 26 as metered by the fuel metering unit 92, and/or the valve position of one or more bleed valves 88 to change the mass flow of the bleed air removed from the core air flowpath of the engine. Further, in some embodiments, in determining the corrective trim for adjusting the power management schedule of the engine, the controller 120 is configured to correlate the stall margin lost/deterioration of the compressor element with one of a plurality of corrective trims. Once the corrective trim is determined, the controller 120 is configured to adjust the power management schedule of the engine based at least in part on the corrective trim.

Figure 10:
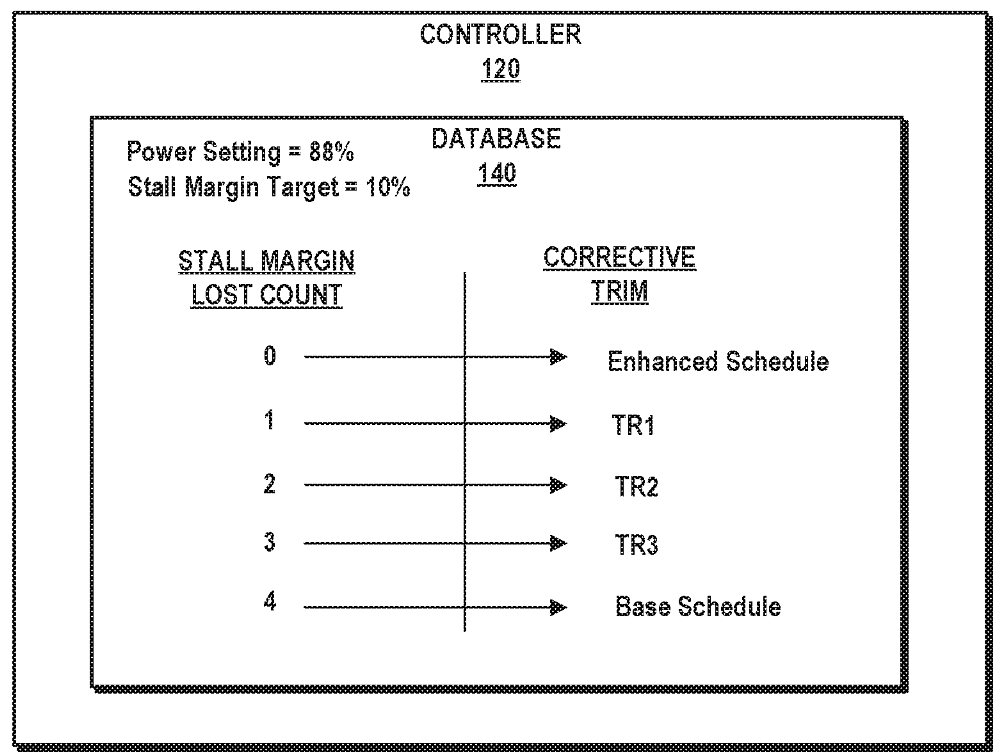
FIG. 10 provides a database of the controller of FIG. 3 that correlates a stall margin lost count with various corrective trims.
Figure 11:
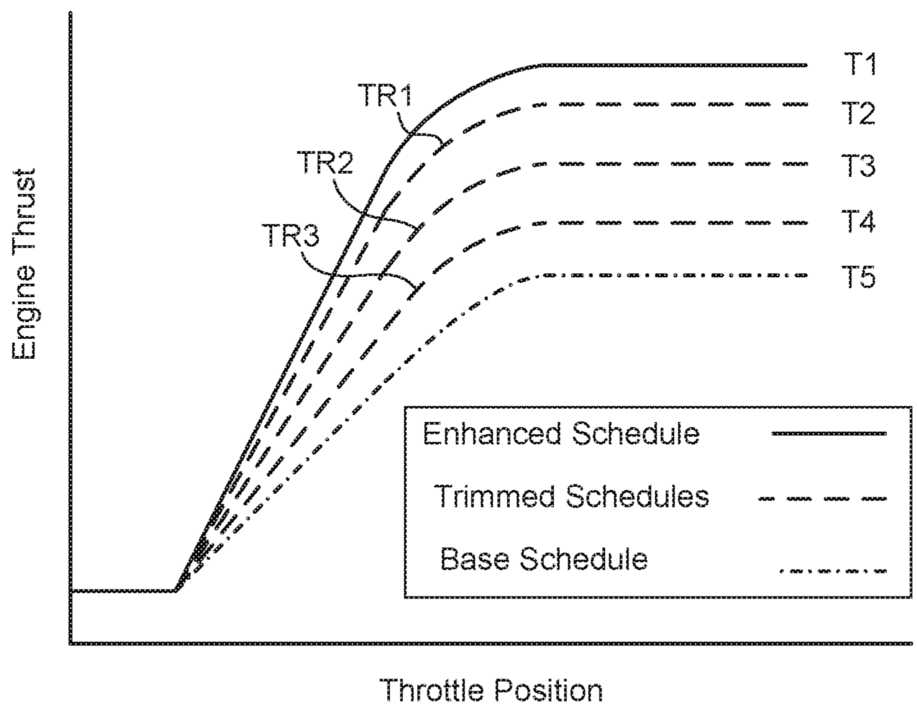
FIG. 11 provides a graph depicting engine thrust for various trimmed power management schedules as a function of throttle position in accordance with exemplary aspects of the present disclosure.

By way of example, with reference now generally to FIGS. 7, 10, and 11, FIG. 10 provides a database 140 of the controller 120 that correlates or associates the stall margin lost count (the health status indicator in this example) with various corrective trims for a particular power setting (e.g., 88% of full power) of the engine and stall margin target (e.g., 10% margin from stall). FIG. 11 provides a graph depicting engine thrust for various trimmed power management schedules as a function of throttle position in accordance with exemplary aspects of the present disclosure.

As shown in FIG. 10, for this example, a stall margin lost count of "0" correlates with a corrective trim associated with the Enhanced Schedule. Accordingly, as shown in FIG. 11, the power management schedule is adjusted or set as the Enhanced Schedule when the stall margin lost count is "0", which in this example occurs in time at time T1 up until about time T2. In this way, optimal performance can be achieved, e.g., for high power throttle positions.

As further depicted in FIG. 10, a stall margin lost count of "1" correlates with a corrective trim TR1. The corrective trim TR1 can be applied to the Enhanced Schedule or the Base Schedule to adjust the power management schedule of the engine. At or just after time T2 when the Stall Margin Signal exceeds the Margin Threshold as shown in FIG. 7, the power management schedule is adjusted with corrective trim TR1 as shown in FIG. 11. While the power management schedule trimmed with corrective trim TR1 does not provide the same level of performance of the Enhanced Schedule at high power throttle positions as shown in FIG. 11, the adjustment of the power management schedule with corrective trim TR1 returns or drives the Stability Margin Signal back to the Stall Margin Target as shown in FIG. 7. That is, when the power management schedule is trimmed with corrective trim TR1 just after time T2, the Stall Margin Signal reverts to the Stall Margin Target to maintain sufficient margin from stall. Thus, as the stall margin lost increases (e.g., at time T2), which is indicative of deterioration of the compressor element, the power management schedule is trimmed to maintain an acceptable stall margin whilst maintaining optimal performance.

As further shown in FIG. 10, a stall margin lost count of "2" correlates with a corrective trim TR2. The corrective trim TR2 can be applied to the Enhanced Schedule or the Base Schedule to adjust the power management schedule of the engine. At or just after time T3 when the Stall Margin Signal exceeds the Margin Threshold as shown in FIG. 7, the power management schedule is adjusted with corrective trim TR2 as shown in FIG. 11. While the power management schedule trimmed with corrective trim TR2 does not provide the same level of performance of the Enhanced Schedule or the trimmed schedule TR1 at high power throttle positions as shown in FIG. 11, the adjustment of the power management schedule with corrective trim TR2 returns or drives the stability margin back to the stall margin target as shown in FIG. 7. That is, when the power management schedule is trimmed with corrective trim TR2 just after time T3, the Stall Margin Signal reverts to the Stall Margin Target to maintain sufficient margin from stall.

Similarly, as depicted in FIG. 10, a stall margin lost count of "3" correlates with a corrective trim TR3. The corrective trim TR3 can be applied to the Enhanced Schedule or the Base Schedule to adjust the power management schedule of the engine. At or just after time T4 when the Stall Margin Signal exceeds the Margin Threshold as shown in FIG. 7, the power management schedule is adjusted with corrective trim TR3 as shown in FIG. 11. While the power management schedule trimmed with corrective trim TR3 does not provide the same level of performance of the Enhanced Schedule, the trimmed schedule TR1, or the trimmed schedule TR2 at high power throttle positions as shown in FIG. 11, the adjustment of the power management schedule with corrective trim TR3 returns or drives the stability margin back to the stall margin target as shown in FIG. 7. That is, when the power management schedule is trimmed with corrective trim TR3 just after time T4, the Stall Margin Signal reverts to the Stall Margin Target to maintain sufficient margin from stall.

As illustrated in FIG. 10, a stall margin lost count of "4" correlates with a corrective trim associated with the Base Schedule. At or just after time T5 when the Stall Margin Signal exceeds the Margin Threshold as shown in FIG. 7, the power management schedule is adjusted Base Schedule as shown in FIG. 11. In this way, compressor stall can be prevented for the worst-case fully deteriorated engine. Specifically, the stall margin can be held at the Stall Margin Target for normal operating conditions despite the now deteriorated compressor element.

The database 140 of controller 120 shown in FIG. 10 is representative of one lookup table that can be used for a particular engine power setting and stall margin target. The database 140 can include lookup tables that associate the Stall Margin Lost Count with corrective trims for various power settings of the engine, e.g., for 95%, 90%, 85%, 80%, 75%, 70% engine power, etc. and for various Stall Margin Targets, e.g., 5% from stall, 10% from stall, 15% from stall, 20% from stall, etc. Moreover, as will be appreciated, the database 140 can associate less or more than the number of counts and corrective trims shown in FIG. 10.

As noted previously, the controller 120 is configured to set a stall margin target, e.g., shown in FIG. 7 as the Stall Margin Target. In some embodiments, the controller 120 is configured to determine the corrective trim for adjusting the power management schedule of the engine based at least in part on the stall margin target. For instance, the controller 120 can determine the corrective trim for adjusting the power management schedule based at least in part on a determined or predefined relationship between engine power management parameters and stall margin recovery parameters for a given compression element. Adaptive trims can be continuously calculated and used to optimize the tradeoff between performance and operability over time. For instance, when the power management schedule of the engine is adjusted based at least in part on the corrective trim and the stall margin target, the power management schedule is adjusted such that the signal indicative of the stall margin of the compressor element returns or reverts to the stall margin target. For example, as depicted in FIG. 7, when the power management schedule is adjusted based at least in part on the corrective trim and the stall margin target at time T2, time T3, and time T4, the power management schedule is adjusted such that the Stall Margin Signal returns to the Stall Margin Target.

With reference again to FIG. 2, once the controller 120 adjusts the power management schedule, the controller 120 can cause adjustment of one or more engine systems or components that affect the mass flow through or across the compressor element. As one example, the controller 120 can cause adjustment of one or more variable geometry components 86 of the engine 100 based at least in part on the adjusted power management schedule of the engine 100. As another example, the controller 120 can cause adjustment of the fuel metering device 92 of the engine 100 based at least in part on the adjusted power management schedule of the engine. For instance, the fuel metering device 92 can change the mass flow of fuel to the combustor 26 based at least in part on the adjusted power management schedule for particular power settings. As yet another example, the controller 120 can cause adjustment of the fan 38 of the engine 100 based at least in part on the adjusted power management schedule of the engine 100. For instance, the fan speed can be adjusted and/or the pitch of the fan blades 40 can be adjusted in embodiments in which the fan blades 40 are rotatable about respective pitch axes P (FIG. 1). In yet a further example, the controller 120 can cause adjustment of one or more bleed valves 88 of the engine 100 based at least in part on the adjusted power management schedule of the engine 100. In this way, the mass flow through the core air flowpath, and consequently the compressor element, can be changed, which ultimately can alter the stall margin of the compressor element.

Advantageously, in controlling an engine utilizing the adaptive control scheme described above as opposed to conventional control schemes, the engine can operate closer to the stall margin for the vast majority of the engine cycle (see FIG. 5), and consequently, improved performance can be achieved (see FIG. 6). Where conventional systems attempt to detect imminent stall based on compressor health indications and trigger a controller response to rapidly alter control demands, e.g., to increase bleed flow or reduce fuel flow to avoid engine stall. In contrast, the adaptive PHM control scheme and system described herein passively monitors stall margin reductions (i.e., stability margin lost) and applies corrective trims to the power management schedule to recover operability over time. For instance, as shown in FIG. 7, the excess margin associated with conventional control schemes is eliminated with the adaptive control scheme of the present disclosure. The adaptive PHM control system 100 of the present disclosure adjusts the power management schedules only as needed to sustain a stall margin target, which allows for a more optimized and gradual performance to operability trade-off than conventional control schemes.

Further, in some embodiments, the controller 120 can cause alerts to be sent to appropriate entities when maintenance of the compressor element is required. For instance, in some embodiments, the controller 120 is configured to determine whether the stall margin lost exceeds a margin lost threshold. In such embodiments, the controller 120 is configured to cause a notification to be sent based at least in part on whether the stall margin lost exceeds the margin lost threshold. The notification can be a notification indicating that maintenance is required on the compressor element, for example. For instance, if the stall margin lost exceeds the margin lost threshold, then the controller 120 can cause the notification to be sent. On the other hand, if the stall margin lost does not exceed the margin lost threshold, then the controller 120 can do nothing or send a notification indicating the health status of the compressor element.

As shown in FIG. 8, a Margin Lost Threshold is depicted. In some embodiments, when the Stall Margin Lost exceeds the Margin Lost Threshold at time T5, the controller 120 can cause a notification indicating that maintenance is required on the compressor element to be sent. For instance, the notification can be sent to any suitable entity, computing system, etc. As one example, the notification can be sent to an aircraft computing system to which the engine is mounted, to the remote computing system 200 (FIG. 2), to a maintenance entity, etc.

Figure 12:
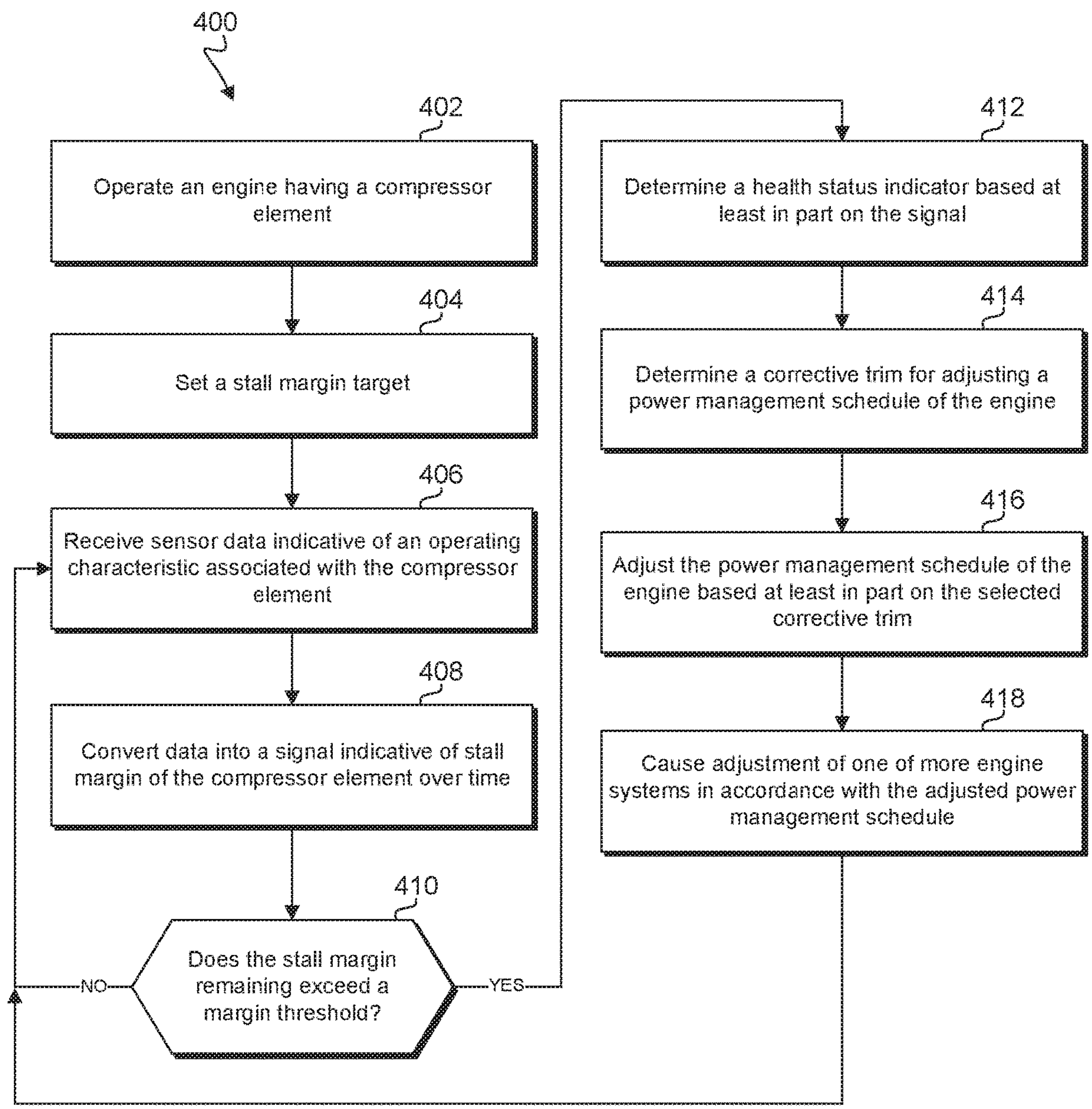
FIG. 12 provides a flow diagram of an exemplary method in accordance with an exemplary embodiment of the present disclosure.

FIG. 12 provides a flow diagram of an exemplary method (400) for controlling a turbine engine in accordance with an exemplary embodiment of the present disclosure. For instance, the method (400) can be implemented to control the turbofan 10 of FIGS. 1 and 2. However, the method (400) can be implemented to control other engines having a compressor element as well. Some or all of the method (400) can be implemented by the control system 100 described herein. In addition, it will be appreciated that exemplary method (400) can be modified, adapted, expanded, rearranged and/or omitted in various ways without deviating from the scope of the present subject matter.

At (402), the method (400) includes operating an engine having a compressor element. For instance, the engine can be a gas turbine engine, such as e.g., the turbofan 10 of FIGS. 1 and 2. Moreover, the gas turbine engine can be another suitable type of gas turbine engine, such as, e.g., a turboprop, a turboshaft, a jet engine, an aeroderivative gas turbine engine, a marine gas turbine engine, etc. In yet other embodiments, the engine can be a different type of turbine engine, such as e.g., a steam turbine engine. The compressor element can be any suitable rotatable compressor. For instance, the compressor element can be the booster 22, the HP compressor 24, and/or the fan 38 of the turbofan 10 of FIGS. 1 and 2. In some implementations, the compressor element can be an annular array of compressor blades or stator vanes. In yet other implementations, the compressor element can be a single blade or vane of an annular array. In some other implementations, the compressor element can be a radial compressor or impeller.

At (404), the method (400) includes setting, by one or more computing devices, a stall margin target associated with the compressor element. For instance, the one or more computing devices can include the engine controller 120 described herein. The controller 120 can set the stall margin target automatically or based on user input, e.g., from a pilot. The stall margin target is set at a higher margin than and is offset from stall so that there is sufficient margin between the operating line of the engine and stall. For instance, as shown in FIG. 7, the controller 120 has set the Stall Margin Target such that it is offset from stall by a Desired Margin.

At (406), the method (400) includes receiving, by the one or more computing devices, data indicative of an operating characteristic associated with the compressor element of the engine. For instance, the data indicative of the operating characteristics associated with the compressor element of the engine can be at least one of a pressure and a temperature at the compressor element. The data can be routed from one or more sensors positioned at or proximate the compressor element. For instance, the one or more sensors can be high bandwidth pressure sensors. For example, with reference to FIG. 2, the sensors can include the sensor 110 positioned along the booster 22 of the turbofan 10, the sensor 112 positioned along the HP compressor 24, and/or the sensor 114 positioned along the fan 38. One or more of the computing devices of the control system 100 can receive the data. For instance, the signal interpreter box 126 depicted in FIG. 2 can receive the data from the signals.

At (408), the method (400) includes determining, by the one or more computing devices, a signal indicative of a stall margin of the compressor element over time based at least in part on the received data. For instance, the one or more computing devices can convert the data indicative of the operating characteristic associated with the compressor element into a signal indicative of the stall margin of the compressor element over time. For example, with reference to FIG. 7, the received data can be converted into stall margin remaining as shown by the line labeled Stall Margin Signal. The signal interpreter box 126 can determine the signal indicative of a stall margin of the compressor element over time based at least in part on the received data, for example.

At (410), in some implementations, the method (400) includes passively monitoring, by the one or more computing devices, the signal to determine whether the signal exceeds a margin threshold. For instance, as shown in FIG. 7, the one or more computing devices can monitor the Stall Margin Signal to determine whether the Stall Margin Signal exceeds the Margin Threshold. The Margin Threshold can be set at a lower margin than the Stall Margin Target but at a higher margin than Stall as shown in FIG. 7. The one or more computing devices (e.g., the controller 120) can monitor the Stall Margin Signal continuously or at a predetermined interval. If the Stall Margin Signal does not exceed the Margin Threshold as determined at (410), then the one or more computing devices continue to receive data indicative of an operating characteristic associated with the compressor element of the engine at (406), convert the data into the signal indicative of the stall margin remaining over time at (408), and then continue to passively monitor the signal at (410) to once again determine if the signal exceeds the margin threshold, e.g., as shown in FIG. 12.

On the other hand, if the Stall Margin Signal exceeds the Margin Threshold as determined at (410), then the one or more computing devices proceed forward with making adjustments to drive the Stall Margin Signal back to the Stall Margin Target. For instance, as shown in FIG. 7, when the Stall Margin Signal exceeds the Margin Threshold at time T2, at time T3, at time T4, and at time T5, the one or more computing devices make adjustments to drive the Stall Margin Signal back to the Stall Margin Target. For instance, in some implementations, the one or more computing devices are configured to determine a health status indicator of the compressor element based at least in part on the signal when the signal exceeds the margin threshold. That is, when the Stall Margin Signal exceeds the Margin Threshold, the one or more computing devices are configured to determine a health status indicator of the compressor element, e.g., as explained more fully below at (412).

At (412), the method (400) includes determining, by the one or more computing devices, a health status indicator of the compressor element based at least in part on the determined signal. For instance, the one or more computing devices can determine the health status indicator of the compressor element continuously, at a predetermined interval, or upon a trigger condition, such as e.g., when the signal indicative of the stall margin over time exceeds the margin threshold. In some implementations, determining, by the one or more computing devices, the health status indicator of the compressor element based at least in part on the determined signal at (412) includes determining the stall margin lost of the compressor element. The stall margin lost of the compressor element is indicative of how much the compressor element has degraded over time.

In some implementations, the stall margin lost can be based at least in part on how many times the signal exceeds the margin threshold. That is, the stall margin lost can be tracked as a stall margin lost count. For instance, each time the stall margin remaining exceeds the margin threshold, a count can be added to the stall margin lost count. For example, as shown in FIGS. 7 and 8, each time the Stall Margin Signal exceeds the Margin Threshold, e.g., at time T2, at time T3, at time T4, and at time T5 as shown in FIG. 7, a count is added to the stall margin lost count as represented by the step function in FIG. 8. Notably, the stall margin lost increases or "steps up" each time the Stall Margin Signal exceeds the Margin Threshold, e.g., at time T2, at time T3, at time T4, and at time T5. Each time the Stall Margin Signal exceeds the Margin Threshold, the stall margin count increases.

At (414), the method (400) includes determining, by the one or more computing devices, a corrective trim for adjusting a power management schedule of the engine based at least in part on the health status indicator and the stall margin target. Stated another way, a corrective trim is determined so that it can be applied to adjust the power management schedule of the engine. In this way, the deterioration of the compressor element is accommodated whilst compressor stall is prevented. Moreover, the application of the corrective trim to the power management schedule can cause the measured stall margin to be driven back to the stall margin target.

In some implementations, determining, by the one or more computing devices, the corrective trim for adjusting the power management schedule of the engine based at least in part on the health status indicator and the stall margin target at (414) includes correlating the determined stall margin lost of the compressor element with one of a plurality of corrective trims, and wherein the correlated corrective trim is selected for adjusting the power management schedule. For instance, the stall margin lost count can be representative of the stall margin lost. As shown in FIG. 10, the controller 120 includes database 140 that correlates the Stall Margin Lost Count with corrective trims. The database 140 is a lookup table in this example for a power setting of 88% of full power and for a stall margin target of 10% of Stall. To correlate the Stall Margin Lost Count with one of the plurality of corrective trims, the controller 120 selects the corrective trim associated with the Stall Margin Lost Count. For example, if the Stall Margin Lost Count is determined to be "3", the controller 120 correlates the Stall Margin Lost Count of "3" with the associated corrective trim, which in this example is "TR3." The database 140 of controller 120 shown in FIG. 10 is representative of one lookup table that can be used for a particular engine power setting and stall margin target. As noted previously, the database 140 can include lookup tables that associate the Stall Margin Lost Count with corrective trims for various power settings of the engine, e.g., for 95%, 90%, 85%, 80%, 75%, 70% engine power, etc. and for various Stall Margin Targets, e.g., 5% from stall, 10% from stall, 15% from stall, 20% from stall, etc. Thus, in determining the corrective trim, the controller 120 accesses database 140 to select the correct power setting and stall margin target such that the correct corrective trim can be selected to drive the Stall Margin Signal back to the Stall Margin Target, e.g., as shown in FIG. 7. Moreover, as will be appreciated, the database 140 can associate less or more than the number of counts and corrective trims shown in FIG. 10.

In some implementations, the method (400) can include determining whether the stall margin lost exceeds a margin lost threshold. Further, the method (400) can include causing, by the one or more computing devices, a media certification to be sent based at least in part on whether the stall margin lost exceeds the margin lost threshold. In such implementations, if the stall margin lost exceeds the margin lost threshold, the one or more computing devices can cause the maintenance notification to be sent, e.g., to the remote computing system 200 depicted in FIG. 2 or some other maintenance entity. By way of example, as shown in FIG. 8, when the determined Stall Margin Lost exceeds the Margin Lost Threshold, e.g., at about time T5, the one or more computing devices can cause the maintenance notification to be sent as exceeding the Margin Lost Threshold can correspond with an unacceptable level of deterioration of the compressor element.

At (416), the method (400) includes adjusting, by the one or more computing devices, the power management schedule of the engine based at least in part on the determined corrective trim. For instance, once the corrective trim is determined or selected at (414), the corrective trim can be applied to trim or adjust the power management schedule such that the signal indicative of the stall margin of the compressor element over time is corrected or driven back to the stall margin target, e.g., after the Stall Margin Signal exceeds the Margin Threshold as shown in FIG. 7. In this way, a relatively flat or constant stall margin can be maintained, e.g., at the stall margin target. Gradually trimming the power management schedule over time while maintaining sufficient margin relative to compressor stall provides enhanced engine performance over the life of the engine compared to conventional control schemes, e.g., as graphically represented in FIG. 6.

At (418), the method (400) includes causing, by the one or more computing devices, adjustment of one or more engine systems based at least in part on the adjusted or trimmed power management schedule. For instance, the one or more engine systems can be adjusted such that the mass flow through or across the compressor element can be changed. In this way, compressor stall can be avoided.

For instance, in some implementations, the one or more engine systems can include one or more variable geometry components. Thus, in such implementations, causing, by the one or more computing devices, adjustment of one or more engine systems based at least in part on the adjusted power management schedule at (418) includes causing, by the one or more computing devices, adjustment of one or more variable geometry components based at least in part on the adjusted power management schedule. For instance, the variable geometry components can include the variable geometry components 86 depicted in FIG. 2.

In other implementations, the one or more engine systems can include a fuel system, and more particularly, a fuel metering device of a fuel system. Thus, in such implementations, causing, by the one or more computing devices, adjustment of one or more engine systems based at least in part on the adjusted power management schedule at (418) includes causing, by the one or more computing devices, adjustment of a fuel metering device based at least in part on the adjusted power management schedule. For instance, the fuel metering device can include the fuel metering device 92 depicted in FIG. 2. When the fuel metering device is adjusted, the mass flow of fuel to the combustor 26 can be changed for a particular power setting.

In yet other implementations, the one or more engine systems can include a fan of the engine or a propeller operatively coupled thereto. In such implementations, causing, by the one or more computing devices, adjustment of one or more engine systems based at least in part on the adjusted power management schedule at (418) includes causing, by the one or more computing devices, adjustment of a fan of the engine based at least in part on the adjusted power management schedule. For instance, the fan can be the fan 38 depicted in FIG. 2. In other implementations, the fan can be a propeller operatively coupled with the engine. In some implementations, adjustment of the fan can be an adjustment of the fan speed for a given power setting. Additionally or alternatively, in some implementations, adjustment of the fan or propeller can be an adjustment of the pitch of the fan or propeller blades about their respective axes.

In some further implementations, the one or more engine systems can include one or more bleed valves, e.g., positioned along the core air flowpath of the engine. In such implementations, causing, by the one or more computing devices, adjustment of one or more engine systems based at least in part on the adjusted power management schedule at (418) includes causing, by the one or more computing devices, adjustment of a bleed valve of the engine based at least in part on the adjusted power management schedule. For instance, the bleed valve can be the bleed valve 88 depicted in FIG. 2. Adjustment of the bleed valve can change the mass flow through the core air flowpath of the engine, and consequently, the compressor element.

Figure 13:
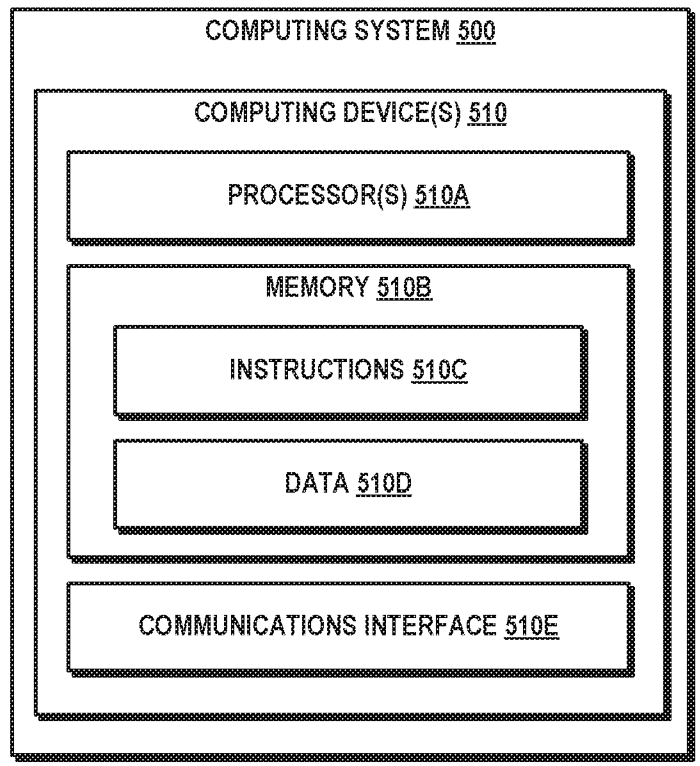
FIG. 13 provides an example computing system according to example embodiments of the present disclosure.

FIG. 13 provides an example computing system 500 according to example embodiments of the present disclosure. The controller 120 described herein can include various components and perform various functions of the computing system 500 described below, for example.

As shown in FIG. 13, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, such as e.g., operations for controlling an engine as described herein. For instance, the method (400) can be implemented in whole or in part by the computing system 500. Accordingly, the method (400) can be at least partially a computer-implemented method such that at least some of the steps of the exemplary method (400) are performed by one or more computing devices, such as the exemplary computing device 510 of the computing system 500. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, databases, etc. For instance, the data 510D can include the database 140 of FIG. 10.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices, such as remote computing system 200, can be configured to receive one or more commands or data from the computing device(s) 510 or provide one or more commands or data to the computing device(s) 510. Moreover, the communications interface 510E can include one or more sensor and effector interfaces, e.g., so that the computing device(s) can communicate with one or more sensors of the control system, such as e.g., sensor 110, 112, 114, etc.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control system for an engine having a compressor element, the control system comprising:

a sensor operable to sense an operating characteristic associated with the compressor element;

one or more computing devices communicatively coupled with the sensor, the one or more computing devices configured to:

receive, from the sensor, data indicative of the operating characteristic associated with the compressor element;

determine a signal indicative of a stall margin of the compressor element over time based at least in part on the received data;

determine a health status indicator of the compressor element based at least in part on the determined signal;

determine a corrective trim for adjusting a power management schedule of the engine based at least in part on the health status indicator of the compressor element; and adjust the power management schedule of the engine based at least in part on the corrective trim.

2. The control system of claim 1, wherein the one or more computing devices are further configured to:

monitor the signal indicative of the stall margin remaining of the compressor element over time to determine whether the signal exceeds a margin threshold, and wherein the one or more computing devices are configured to determine the health status indicator of the compressor element based at least in part on the signal when the signal exceeds the margin threshold.

3. The control system of claim 1, wherein the health status indicator is indicative of a stall margin lost of the compressor element.

4. The control system of claim 3, wherein in determining the corrective trim for adjusting the power management schedule of the engine, the one or more computing devices are further configured to:

correlate the stall margin lost/deterioration of the compressor element with one of a plurality of corrective trims.

5. The control system of claim 3, wherein the one or more computing devices are further configured to:

determine whether the stall margin lost exceeds a margin lost threshold; and cause a maintenance notification to be sent based at least in part on whether the stall margin lost exceeds the margin lost threshold, and wherein if the stall margin lost exceeds the margin lost threshold, the one or more computing devices cause the maintenance notification to be sent.

6. The control system of claim 1, wherein the one or more computing devices are further configured to:

set a stall margin target, and wherein the one or more computing devices are configured to determine the corrective trim for adjusting the power management schedule of the engine based at least in part on the stall margin target, and wherein when the power management schedule of the engine is adjusted based at least in part on the corrective trim, the signal indicative of the stall margin of the compressor element returns to the stall margin target.

7. The control system of claim 1, wherein the operating characteristic associated with the compressor element is at least one of a pressure and a temperature across or at the compressor element.

8. The control system of claim 1, wherein the one or more computing devices are further configured to:

cause adjustment of one or more variable geometry components of the engine based at least in part on the adjusted power management schedule of the engine.

9. The control system of claim 1, wherein the one or more computing devices are further configured to:

cause adjustment of a fuel metering device of the engine based at least in part on the adjusted power management schedule of the engine.

10. The control system of claim 1, wherein the one or more computing devices are further configured to:

cause adjustment of a fan of the engine based at least in part on the adjusted power management schedule of the engine.

11. The control system of claim 1, wherein the one or more computing devices are further configured to:

cause adjustment of a bleed valve of the engine based at least in part on the adjusted power management schedule of the engine.

12. A method, comprising:

operating an engine having a compressor element;

setting, by one or more computing devices, a stall margin target associated with the compressor element;

receiving, by the one or more computing devices, data indicative of an operating characteristic associated with the compressor element of the engine;

determining, by the one or more computing devices, a signal indicative of a stall margin of the compressor element over time based at least in part on the received data;

determining, by the one or more computing devices, a health status indicator of the compressor element based at least in part on the determined signal;

determining, by the one or more computing devices, a corrective trim for adjusting a power management schedule of the engine based at least in part on the health status indicator and the stall margin target; and adjusting, by the one or more computing devices, the power management schedule of the engine based at least in part on the determined corrective trim.

13. The method of claim 12, wherein determining, by the one or more computing devices, the health status indicator of the compressor element based at least in part on the determined signal comprises determining the stall margin lost of the compressor element based at least in part on the determined signal.

14. The method of claim 13, further comprising:

monitoring the signal indicative of the stall margin remaining of the compressor element over time to determine whether the signal exceeds a margin threshold, and wherein the one or more computing devices are configured to determine the health status indicator of the compressor element based at least in part on the signal only when the signal exceeds the margin threshold.

15. The method of claim 14, wherein the stall margin lost is tracked as a stall margin count, and wherein determining, by the one or more computing devices, the corrective trim for adjusting the power management schedule of the engine based at least in part on the health status indicator and the stall margin target comprises correlating, for the set stall margin target and power setting of the engine, the stall margin count with one of a plurality of corrective trims, and wherein the correlated corrective trim is selected for adjusting the power management schedule.

16. The method of claim 12, wherein adjusting, by the one or more computing devices, the power management schedule of the engine based at least in part on the determined corrective trim drives the signal indicative of the stall margin of the compressor element over time back to the stall margin target.

17. The method of claim 12, further comprising:

causing, by the one or more computing devices, adjustment of one or more engine systems of the engine based at least in part on the adjusted power management schedule of the engine such that a mass flow across the compressor element is changed.

18. A turbine engine, comprising:

a compressor element;

a sensor operable to sense an operating characteristic associated with the compressor element;

one or more computing devices communicatively coupled with the sensor, the one or more computing devices are configured to:

receive, from the sensor, data indicative of the operating characteristic associated with the compressor element;

convert the data into a signal indicative of a stall margin of the compressor element;

determine a health status indicator of the compressor element based at least in part on the signal;

determine a corrective trim for adjusting a power management schedule of the engine based at least in part on the health status indicator; and adjust the power management schedule of the engine based at least in part on the corrective trim.

19. The turbine engine of claim 18, wherein the one or more computing devices are further configured to:

monitor the converted signal to determine whether the signal exceeds a margin threshold, and wherein in determining the health status indicator of the compressor element based at least in part on the signal, the controller is configured to:

determine a stall margin lost of the compressor element based at least in part on the signal if the signal exceeds the margin threshold.

20. The turbine engine of claim 18, further comprising:

one or more engine systems communicatively coupled with the controller, and wherein the one or more computing devices are further configured to:

cause adjustment of one or more engine systems of the engine based at least in part on the adjusted power management schedule of the engine such that a mass flow across the compressor element is changed.

* * * * *